(12) United States Patent
Maisch et al.

(10) Patent No.: US 8,074,673 B2
(45) Date of Patent: Dec. 13, 2011

(54) FREEZE-RESISTANT METERING VALVE

(75) Inventors: Dieter Maisch, Kohlberg (DE); Stefan Klotz, Aichtal-Groetzingen (DE); Matthias Bleeck, Aschaffenburg (DE)

(73) Assignee: Hydraulik-Ring GmbH, Marktheidenfeld (DE)

( * ) Notice: Subject to any disclaimer, the term of this patent is extended or adjusted under 35 U.S.C. 154(b) by 231 days.

(21) Appl. No.: 12/456,395

(22) Filed: Jun. 16, 2009

(65) Prior Publication Data
US 2009/0256088 A1 Oct. 15, 2009

Related U.S. Application Data

(60) Division of application No. 11/417,538, filed on May 3, 2006, now Pat. No. 7,594,516, which is a continuation of application No. PCT/EP2005/052226, filed on May 13, 2005.

(30) Foreign Application Priority Data

May 18, 2004 (DE) .................. 10 2004 025 062

(51) Int. Cl.
*F16K 31/02* (2006.01)

(52) U.S. Cl. .............. 137/240; 251/129.16; 251/129.17; 251/335.2

(58) Field of Classification Search .................. 137/240; 251/129.15, 29.16, 129.17, 129.21, 331, 251/335.2

See application file for complete search history.

(56) References Cited

U.S. PATENT DOCUMENTS

| 1,059,370 A | 4/1913 | Johnson |
| 1,971,026 A | 8/1934 | Beall |
| 1,999,221 A | 4/1935 | Walker et al. |
| 2,697,581 A | 12/1954 | Ray |
| 2,938,703 A | 5/1960 | Dietz |
| 3,125,063 A | 3/1964 | Hultgren |
| 3,492,868 A | 2/1970 | Pontis |
| 3,707,954 A | 1/1973 | Nakada et al. |
| 3,894,432 A | 7/1975 | Coughlin |
| 3,903,858 A | 9/1975 | Hecht |
| 3,958,757 A | 5/1976 | Happel et al. |
| 4,146,485 A | 3/1979 | Broad |
| 4,203,554 A | 5/1980 | Zimmer et al. |
| 4,312,382 A | 1/1982 | Gebauer |

(Continued)

FOREIGN PATENT DOCUMENTS

| CA | 2 199 737 | 3/1996 |
| CH | 359182 | 12/1961 |

(Continued)

OTHER PUBLICATIONS

Burkert Fluid Control Systems, "Solenoid Valves with Piston, Servo-Assisted", archived Jan. 10, 2005.

*Primary Examiner* — John Bastianelli
(74) *Attorney, Agent, or Firm* — Lipsitz & McAllister, LLC (57) ABSTRACT

A freeze-resistant metering valve is provided that comprises a magnetic part and a hydraulic part. The magnetic part has an armature biased by a spring. The hydraulic part has an annular space for receiving and conveying a liquid as well as a tappet facing a valve seat. The valve seat comprises a nozzle opening on the side facing away from the tappet. In a currentless state, the tappet blocks the annular space in the direction of an opening (nozzle opening) until a freezing pressure exerted onto the armature generates a sufficient force by virtue of the solidifying liquid. This force is used to counteract the spring force until a freeze expansion space is created by way of a relieving motion.

20 Claims, 4 Drawing Sheets

U.S. PATENT DOCUMENTS

| | | | |
|---|---|---|---|
| 4,529,512 A | 7/1985 | Williamson et al. | |
| 4,530,486 A | 7/1985 | Rusnak | |
| 4,595,037 A | 6/1986 | LeBreton et al. | |
| 4,610,786 A | 9/1986 | Pearson | |
| 4,693,202 A | 9/1987 | Helpiö | |
| 4,714,234 A | 12/1987 | Falk et al. | |
| 4,742,964 A | 5/1988 | Ito et al. | |
| 4,805,837 A | 2/1989 | Brooks et al. | |
| 4,836,923 A | 6/1989 | Popoff et al. | |
| 4,839,048 A | 6/1989 | Reed et al. | |
| 4,842,737 A | 6/1989 | Reed | |
| 4,963,332 A | 10/1990 | Brand et al. | |
| 5,002,230 A | 3/1991 | Norskov et al. | |
| 5,009,367 A | 4/1991 | Nielsen | |
| 5,017,285 A | 5/1991 | Janik et al. | |
| 5,045,192 A | 9/1991 | Terhune | |
| 5,114,077 A | 5/1992 | Cerny | |
| 5,122,264 A | 6/1992 | Mohr et al. | |
| 5,236,579 A | 8/1993 | Janik et al. | |
| 5,238,224 A | 8/1993 | Horsting | |
| 5,299,776 A | 4/1994 | Brinn, Jr. et al. | |
| 5,356,034 A | 10/1994 | Schlumberger | |
| 5,399,264 A | 3/1995 | Pulek et al. | |
| 5,413,711 A | 5/1995 | Janik | |
| 5,468,388 A | 11/1995 | Goddard et al. | |
| 5,522,218 A | 6/1996 | Lane et al. | |
| 5,605,042 A | 2/1997 | Stutzenberger | |
| 5,680,879 A * | 10/1997 | Sheih et al. | 137/240 |
| 5,685,985 A | 11/1997 | Brown et al. | |
| 5,884,475 A | 3/1999 | Hofmann et al. | |
| 5,968,464 A | 10/1999 | Peter-Hoblyn et al. | |
| 5,976,475 A | 11/1999 | Peter-Hoblyn et al. | |
| 6,063,350 A | 5/2000 | Tarabulski et al. | |
| 6,105,884 A | 8/2000 | Molnar et al. | |
| 6,125,629 A | 10/2000 | Patchett | |
| 6,203,770 B1 | 3/2001 | Peter-Hoblyn et al. | |
| 6,279,603 B1 | 8/2001 | Czarnik et al. | |
| 6,306,192 B1 | 10/2001 | Greif et al. | |
| 6,474,961 B1 | 11/2002 | Timmer et al. | |
| 6,513,323 B1 | 2/2003 | Weigl et al. | |
| 6,516,607 B1 | 2/2003 | Brück et al. | |
| 6,517,047 B2 | 2/2003 | Koch-Groeber | |
| 6,526,746 B1 | 3/2003 | Wu | |
| 6,539,708 B1 | 4/2003 | Hofmann et al. | |
| 6,554,139 B1 | 4/2003 | Maxwell et al. | |
| 6,631,883 B1 | 10/2003 | Van Den Brink | |
| 6,685,829 B1 | 2/2004 | Baumann et al. | |
| 6,912,846 B2 | 7/2005 | Huber et al. | |
| 6,945,035 B2 | 9/2005 | Hirooka et al. | |
| 7,100,366 B2 | 9/2006 | Hager et al. | |
| 7,156,239 B2 | 1/2007 | Klotz et al. | |
| 7,278,625 B2 | 10/2007 | Huber et al. | |
| 7,296,689 B2 | 11/2007 | Klotz et al. | |
| 7,316,545 B2 | 1/2008 | Lenke | |
| 7,393,187 B2 | 7/2008 | Weigl | |
| 7,458,204 B2 | 12/2008 | Plougmann | |
| 7,481,049 B2 | 1/2009 | Huber et al. | |
| 7,509,799 B2 | 3/2009 | Amou et al. | |
| 7,594,393 B2 | 9/2009 | Offenhuber et al. | |
| 7,617,991 B2 | 11/2009 | Wells et al. | |
| 2002/0001554 A1 | 1/2002 | Czarnik et al. | |
| 2002/0078732 A1 | 6/2002 | Bentley | |
| 2002/0081239 A1 | 6/2002 | Palesch et al. | |
| 2002/0088955 A1 | 7/2002 | Gamou et al. | |
| 2003/0024320 A1 | 2/2003 | Bentley | |
| 2003/0033799 A1 | 2/2003 | Scheying | |
| 2003/0101716 A1 | 6/2003 | Hirooka et al. | |
| 2003/0168620 A1 | 9/2003 | Dralyuk | |
| 2003/0209482 A1 | 11/2003 | Klotz et al. | |
| 2004/0060286 A1 | 4/2004 | Huber et al. | |
| 2004/0093856 A1 | 5/2004 | Dingle et al. | |
| 2004/0098978 A1 | 5/2004 | Tarabulski et al. | |
| 2004/0101450 A1 | 5/2004 | Mayer | |
| 2004/0103641 A1 | 6/2004 | Maisch | |
| 2004/0159721 A1 | 8/2004 | Shiraishi et al. | |
| 2004/0179960 A1 | 9/2004 | Lenke | |
| 2004/0191093 A1 | 9/2004 | Weigl | |
| 2004/0262333 A1 * | 12/2004 | Huber et al. | 222/207 |
| 2005/0069468 A1 | 3/2005 | Huber et al. | |
| 2005/0229969 A1 * | 10/2005 | Nguyen et al. | 137/240 |
| 2005/0284136 A1 | 12/2005 | Plougmann | |
| 2006/0196172 A1 | 9/2006 | Johnson et al. | |
| 2009/0038292 A1 | 2/2009 | Plougmann | |

FOREIGN PATENT DOCUMENTS

| | | |
|---|---|---|
| DE | 1 148 614 | 5/1963 |
| DE | 2 121 533 | 11/1972 |
| DE | 2 211 096 | 9/1973 |
| DE | 24 59 790 | 7/1976 |
| DE | 28 12 076 | 10/1979 |
| DE | 83 06 612 | 8/1983 |
| DE | 39 01 032 | 2/1990 |
| DE | 38 33 134 | 4/1990 |
| DE | 41 04 382 | 8/1992 |
| DE | 42 37 900 | 5/1993 |
| DE | 42 30 056 | 3/1994 |
| DE | 43 21 927 | 1/1995 |
| DE | 44 32 576 | 3/1996 |
| DE | 44 32 577 | 3/1996 |
| DE | 44 36 397 | 4/1996 |
| DE | 195 36 613 | 11/1996 |
| DE | 198 17 994 | 11/1999 |
| DE | 198 40 569 | 3/2000 |
| DE | 199 08 671 | 8/2000 |
| DE | 199 35 920 | 3/2001 |
| DE | 199 45 900 | 4/2001 |
| DE | 199 47 198 | 4/2001 |
| DE | 100 47 516 | 4/2002 |
| DE | 100 47 531 | 4/2002 |
| DE | 100 52 077 | 5/2002 |
| DE | 100 52 103 | 5/2002 |
| DE | 100 58 015 | 5/2002 |
| DE | 101 39 142 | 2/2003 |
| DE | 101 47 172 | 4/2003 |
| DE | 101 50 518 | 5/2003 |
| DE | 101 39 139 | 6/2003 |
| DE | 101 61 132 | 6/2003 |
| DE | 102 56 169 | 6/2003 |
| DE | 102 20 672 | 11/2003 |
| DE | 699 10 605 | 6/2004 |
| DE | 699 10 776 | 6/2004 |
| DE | 103 41 996 | 3/2005 |
| DE | 20 2005 002 544 | 5/2005 |
| DE | 103 59 522 | 7/2005 |
| DE | 10 2004 003 201 | 8/2005 |
| DE | 10 2004 006 333 | 9/2005 |
| DE | 10 2004 035 119 | 2/2006 |
| DE | 10 2004 054 238 | 5/2006 |
| DE | 20 2004 020 234 | 5/2006 |
| DE | 10 2005 056 395 | 11/2006 |
| DE | 10 2005 030 421 | 1/2007 |
| DE | 10 2005 037 150 | 2/2007 |
| DE | 10 2006 014 074 | 10/2007 |
| DE | 10 2007 004 687 | 8/2008 |
| DE | 10 2008 012 780 | 9/2009 |
| EP | 0 663 226 | 7/1995 |
| EP | 0 826 097 | 3/1998 |
| EP | 1 236 499 | 9/2002 |
| EP | 1 281 426 | 2/2003 |
| EP | 1 314 864 | 5/2003 |
| EP | 1 435 458 | 7/2004 |
| EP | 1 481 719 | 12/2004 |
| GB | 2 137 110 | 10/1984 |
| JP | 56 164287 | 12/1981 |
| JP | 56164287 | 12/1981 |
| JP | 2000-240429 | 9/2000 |
| JP | 2001280189 | 10/2001 |
| JP | 2002525491 | 8/2002 |
| WO | 01/91881 | 12/2001 |
| WO | 02/27280 | 4/2002 |
| WO | 02/42616 | 5/2002 |
| WO | 02/50497 | 6/2002 |
| WO | 03/016687 | 2/2003 |
| WO | 03/085270 | 10/2003 |
| WO | 2004/079168 | 9/2004 |

\* cited by examiner

FREEZE-RESISTANT METERING VALVE

This application is a divisional of U.S. patent application Ser. No. 11/417,538, filed on May 3, 2006, which application is a continuation of International patent application No. PCT/EP2005/052226 filed on May 13, 2005, and which application claims priority of German patent application No. 10 2004 025 062.6 filed on May 18, 2004, each of which is incorporated herein and made a part hereof by reference.

BACKGROUND OF THE INVENTION

The invention relates to a freeze-resistant metering valve which can be used in automotive engineering, in particular utility vehicles. The freeze-resistant metering valve is, in particular, suitable for exhaust gas after treatment systems and/or exhaust systems.

Motor vehicles, in particular utility vehicles which are intended to be used in regions with a temperate climate or even arctic regions, have to be designed so that they can withstand temperatures below zero degrees Celsius without sustaining damage. This is generally possible by the choice of suitable materials. Alternatively, for many years an additional source of heat has been used when temperatures fall too low.

In order to reduce Nitrogen Oxide (NOx) in the exhaust gas of motor vehicles, in particular diesel vehicles, automobile manufacturers and suppliers have agreed to use a 32.5% urea-water solution (UWS). Due to the high proportion of water in the solution, even at low negative temperatures (degrees Celsius), the solution which is pressurized during operation freezes.

For many years now, the industry has been concerned with how the problem of the freezing of the urea-water solution can be handled. One solution consists of removing all the UWS by means of compressed air when switching off the motor vehicle. Such a system requires the presence of an air compressor on board the vehicle. An air pressure generator is typically incorporated in large utility vehicles. No specific air supply system is provided in small utility vehicles and automobiles which are equipped with a diesel engine.

The costly algorithms with which a control device is to be programmed, so that faulty behavior due to freezing can be identified, can be seen from DE 10256169 A (Toyota Motor Corporation Ltd).

DE 10139139 A (Robert Bosch GmbH) proposes to provide the reducing agent line with electrical heating in order to eliminate freezing of the reducing agent. The fact that this is impractical can be seen from DE 19935920 A (Siemens AG). It can be seen from this publication that the heating power requirement for the reducing agent reservoir alone would exceed one kilowatt. Therefore, it can be further seen from the publication that a heat exchanger can be incorporated. According to DE 10139142 A (Robert Bosch GmbH) the heat exchanger has to prevent freezing, even at temperatures below −11° C. The requirements of automobile manufacturers go even further. They require the valves to work perfectly even at an outside temperature of −40° C. It has been considered, therefore, as in DE 4432577 A (Siemens AG), to incorporate a special back-flow prevention valve with variable control operation. DE 4432576 A (Siemens AG) also refers to the difficulty of using frost protection agents. Operating with different volumes is therefore possible.

What all these solutions have in common is that additional measures have to be taken to overcome the risk of freezing. It would be desirable to have a freeze-resistant metering valve which operates perfectly at the high temperatures of the exhaust gas stream which can exceed 700° C. and is simultaneously freeze-resistant. Even at an outside temperature of −40° C., the metering valve still has to be able to be operated, provided that the UWS is present in liquid form. Therefore, the entire system in which the metering valve is incorporated is to be of energy efficient design.

SUMMARY OF THE INVENTION

These and other advantages are fulfilled by a freeze-resistant metering valve according to the invention and a corresponding exhaust gas cleaning system. Various advantageous embodiments are disclosed herein.

The freeze-resistant metering valve is intended to be electrically controllable. As a result, the vehicle controller or a control device particularly appropriate for the exhaust gas stream can meter the correct amount of UWS. The invention can also be used for other liquids which are to be metered. Aspects of the invention are also therefore explained for other liquids. In normal operation, when the entire exhaust gas stream, including exhaust pipes and mufflers, is heated by the waste heat of the engine, no particular attention has to be paid to the risk of freezing. However, it is dangerous when the vehicle is no longer, or not, in operation. In every state under particular consideration, no control signal, i.e. no current, is passed through the valve. The tappet in the metering valve closes the opening through which the UWS is to be conveyed. When the temperature is lowered, for example, from 700° C. to temperatures below the freezing point of the UWS (approximately −11° C.) the metering valve would be permanently damaged, due to the expansion of the UWS, which can be approximately 9 to 11%. The freezing forces of the UWS can be advantageously used in a passive system, by being converted into a relieving motion. The relieving motion produces a freeze expansion space. One possibility is that the relieving motion acts in a controlled manner. The relieving motion acts indirectly or directly on the armature in order to produce a freeze expansion space by a movement of the tappet. The freeze expansion space has to be established within the valve. The freeze expansion space can be located at different positions. In one embodiment, therefore, the freeze expansion space is the region which is produced by lifting the tappet from the valve seat. However, a specific annular space region can also be provided or a space which is only accessible to the liquid by means of the relieving motion. When the pressure in one of the freeze expansion spaces is great enough, the resulting force exceeds the opposing spring force. As a result, the armature can be displaced against the spring force and the tappet is lifted from the seat.

The invention is further characterized in that the amount of liquid which is present in the metering valve is reduced to a minimum. By a clever design of the valve, the space receiving the liquid is minimized, the tappet filling a portion of the space which is designed for conveying the liquid further into the exhaust gas stream, the annular space. Moreover, unnecessary hollow spaces are filled by filling pieces, sleeves, bearings and other closure members. The minimizing of the annular space should be taken even further from the point of view of freeze resistance. However, the minimizing of the annular space should not impede the flow of the material to be metered, the liquid. In other words, the pressure loss should not be noticeable. The pressure loss would be noticeable at a pressure loss of more than 5% of the nominal pressure of the metering valve. Preferably the pressure loss should be under 1% of the nominal pressure of the metering valve. For example, it can be shown that at a nominal pressure of 5 bar absolute, the pressure loss along the entire annular channel should not be over 250 mbar, preferably under 50 mbar.

In a further advantageous embodiment, moreover, the metering valve offers flexible expansion surfaces. Such expansion surfaces can be resilient bases or diaphragms. Due to the freezing pressure, a freeze expansion space bulges out in the region of the resilient base or the diaphragm. If the liquid melts, such as for example the UWS, the resilient base or the diaphragm returns again to its original position. The original position is the operating position.

Moreover, according to a further advantageous aspect, in some embodiments of a freeze-resistant metering valve deliberate undercuts are avoided. Undercuts are avoided in the valves as, in the regions of the undercut, forces can be produced in all directions by the freezing pressure which can lead to damage. The spring which holds the tappet in the currentless state in the locked position is supported such that, in its supported region, no undercuts are necessary. By avoiding undercuts, the freezing liquid is not obstructed.

Additional expansion spaces can be produced, for example, by the nozzle plate, which is present for the equal distribution of the liquid to be metered and is capable of expansion, being able to be lifted from the nozzle opening.

The spring can optionally be located in the liquid.

By means of special seals and special rings, regions in the metering valves are sealed relative to the liquid and thus the amount of liquid present in the valve is reduced.

According to a further advantageous aspect, the metering valve can be designed such that the supply line discharges into a sleeve via an expandable hose. The sleeve exterior thereof can be ribbed. The expandable hose can be slipped over the sleeve exterior. By means of the ribbing of the sleeve exterior, the surroundings are sealed against the UWS. If the UWS freezes in the supply line or in the sleeve, the expandable hose offers an additional compensation space. On the one hand, the hose itself can expand. On the other hand, it can easily be lifted away from several ribs of the sleeve exterior and yet be sealingly held by the remaining ribs of the sleeve exterior.

A further outlet can be provided for the valves. The outlet undertakes two tasks. As, during operation, the metering valve has to be heat resistant and the UWS should not overheat on the inside (a desired temperature of less than 90° C. has to be maintained) it can be necessary to prevent overheating that the nozzle neck of the hydraulic part is cooled by additional liquid. To this end, during the constant circulation of the UWS, said hydraulic part is cooled by the UWS. In the case of freezing of the liquid, the additional outlet undertakes the task of switching the valve to the unpressurized state and also offers an additional expansion space.

By pressing the tappet with stop plates, sleeve armatures or annular armatures, a large surface is provided for bearing the freezing pressure. The large surface converts the force of the freezing pressure of the minimal liquid present into a large force which can act against the spring.

BRIEF DESCRIPTION OF THE DRAWINGS

For better understanding, reference is made to the following Figures, whereby.

DETAILED DESCRIPTION

In the Figures, similar components are numbered with the same reference numerals, even when there are small structural differences.

Figure 1:
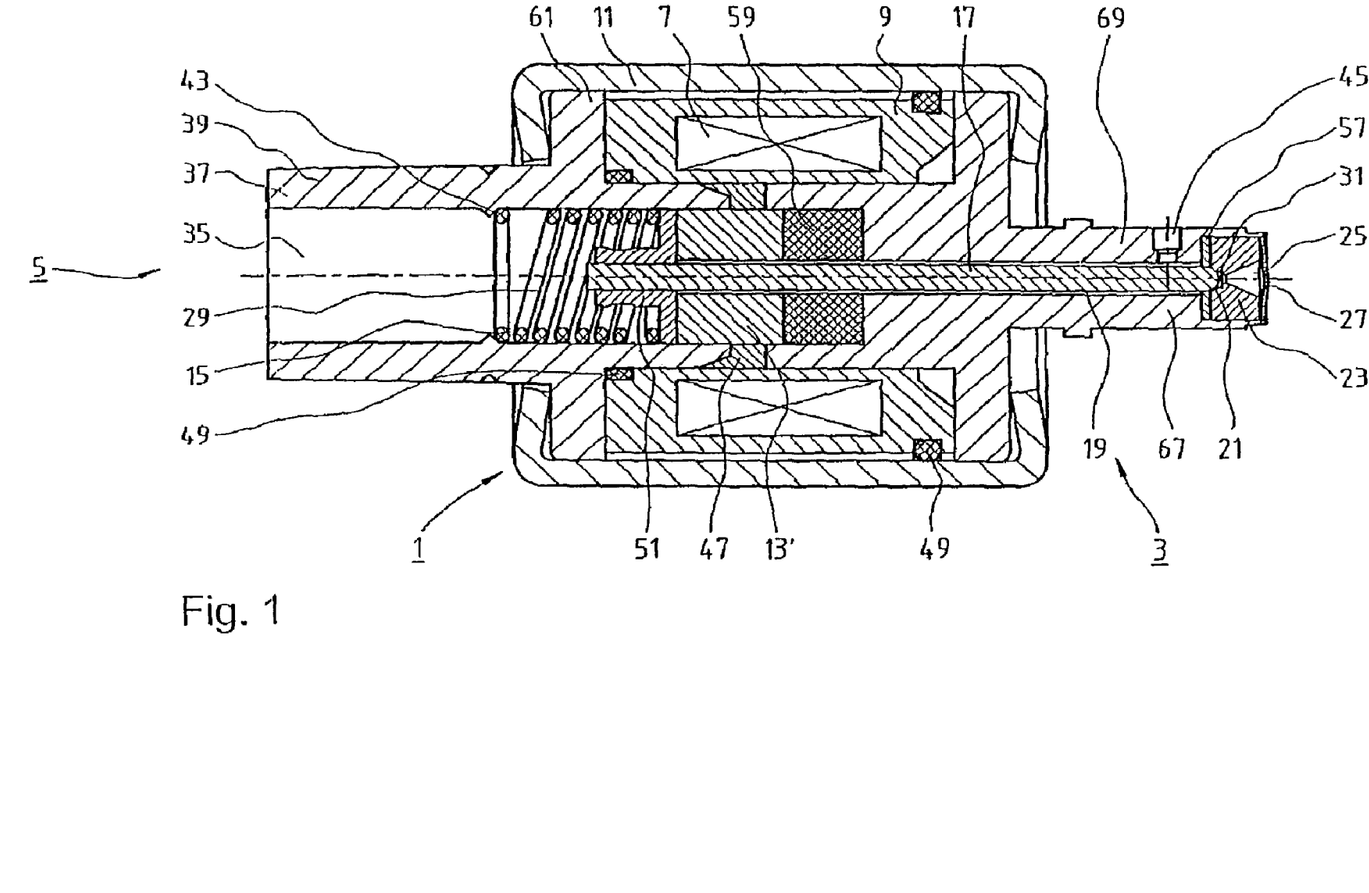
FIG. 1 discloses a first example embodiment of the present invention.

FIG. 1 discloses a metering valve 1. The metering valve 1 comprises a hydraulic part 3 and a magnetic part 5. The magnetic part 5 has a coil 7, which has numerous windings and is arranged on a coil support 9. On the corners of the coil support are provided seals 49 which can be, for example, O-rings. The seals 49 seal the coil support relative to the magnet housing 11 around the pole core 61. The metering valve is, as a whole, rotationally symmetrically constructed. A bore is provided in its center. The tappet 17 moves in the bore. The space which remains of the bore is an annular space 19. The tappet is partially surrounded by an armature which is a sleeve armature 13'. The tappet 17 which leads into the valve seat 21 at its one end, is rounded at the end. On the other end, the tappet 17 leads into an armature sleeve 51. The valve seat 21 is a part of the end piece 23 which also surrounds the nozzle opening 25. Optionally, a nozzle plate 27 can be arranged on the end piece 23. The nozzle plate 27 attenuates the droplets of liquid which are already atomized by the funnel-shaped nozzle opening 25 and by the nozzle 73. The UWS is introduced without compressed air into the exhaust gas stream. It can therefore be necessary for the liquid to be atomized further. A bearing 57 is provided in the vicinity of the end piece 23 by means of which the liquid space is minimized. The bearing 57 guides the tappet 17. The liquid space is further minimized by the sleeve 59. Compensation spaces are intentionally provided on the other side. The opening 45, for example, which is a second opening, serves to relieve the pressure and in the frozen state serves as an outlet to a compensation space, for example in an expansion hose which can be optionally present. The ring 47 undertakes a plurality of tasks: it circulates the magnetic flow, by interrupting the direct flow and seals the supply line and/or the annular space 19 relative to the coil support. Undercuts are avoided by means of the projections 43, on which the spring 15 can be supported. The projections 43 are of such a size that the spring 15 is supported in a stable manner but no effect is produced on the liquid in the supply line 35. On the other side of the spring 15, the spring presses against the armature 13 which is a sleeve armature 13'. Threaded projections are provided on the nozzle neck 67. By means of its nozzle exterior 39 which has a Christmas tree profile, the sleeve 37 is not only provided for the receipt of a resilient hose, but is also simultaneously the pole core 61 for the magnetic end of the coil 7 on the armature 13'. In the currentless state, i.e. the state in which no current flows through the coil 7, the spring 15, via the armature 13', presses the tappet 17 against the valve seat 21. The biasing of the spring 15 is permanently present, provided that the spring is not restricted in its expansion by freezing of the liquid in the supply line 35. The tappet 17 is pressed via the sleeve 51 in the currentless state by the spring force of the spring 15 against the valve seat 21 of the end piece 23. The annular space which, in this embodiment, is 5/10 mm (i.e., 0.5 mm) in total, receives only a minimal amount of liquid. If this minimal amount of liquid freezes, the liquid is pressed against the deformable diaphragm 33 and/or base 33'. The liquid can also be pressed into the resilient hose. If the force exceeds that which is formed by the internal pressure produced on the corresponding surface, the tappet 17 is displaced against the spring force and the tappet 17 is lifted from the valve seat 21. As a result, compensation spaces are opened up. A first compensation space 29 and a second compensation space 31 are provided in this embodiment. Moreover, the opening 45 is provided. The freezing liquid can be diverted into the compensation spaces 29 and 31 which are located in the supply line 35 and the valve seat 21. The magnet housing 11 is flanged at its ends and therefore presses the pole core 61 and the hydraulic part 3 against the ring 47. The magnetic diverter, which the ring 47 represents, seals the two parts of the valve and is optionally welded. The shape of the valve housing 69 corresponds to the receiving unit, for example the exhaust of the motor vehicle, by means of recesses and projections depending on the contour.

Figure 2:
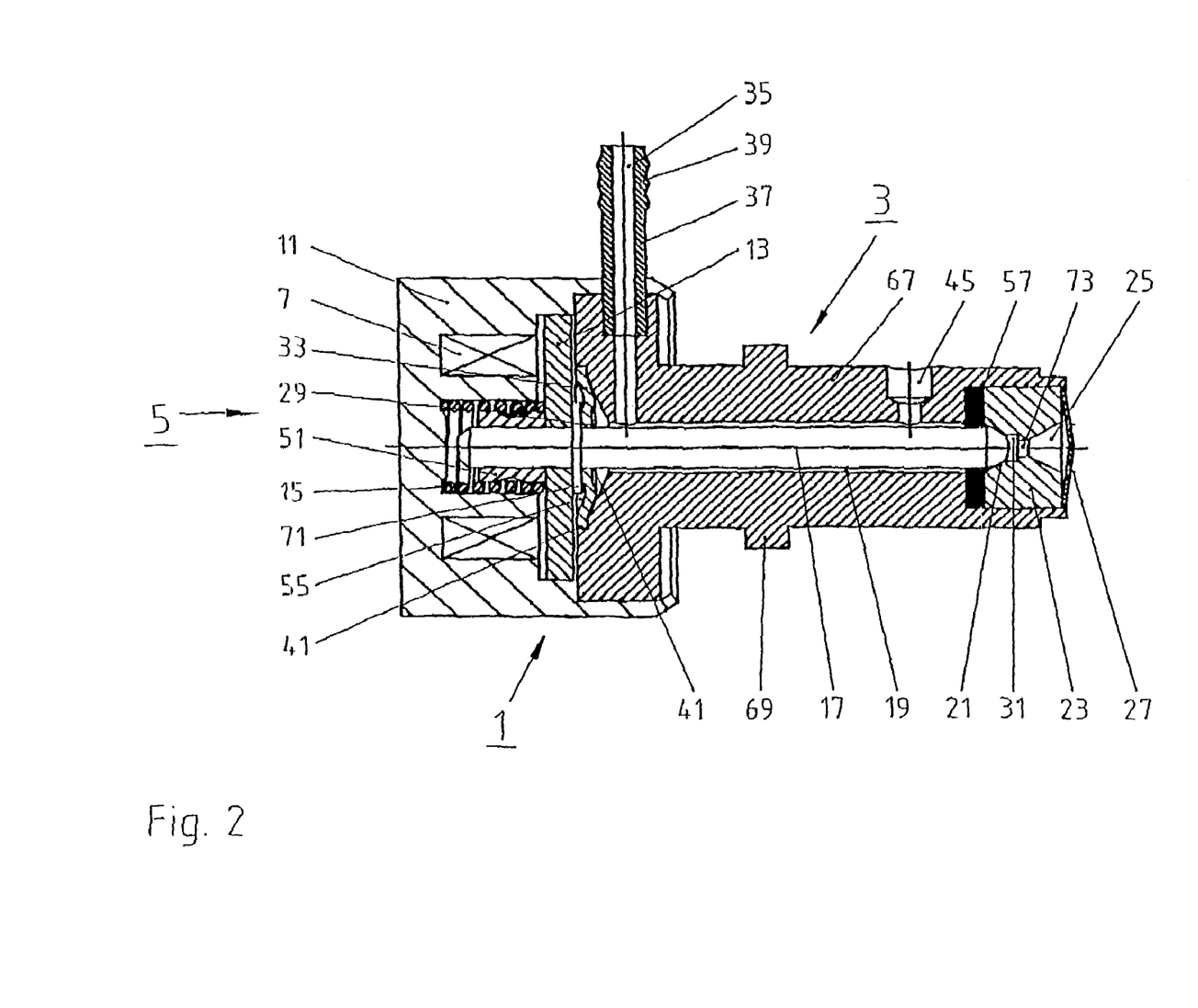
FIG. 2 discloses a second example embodiment of the present invention.

In contrast to the metering valve 1 according to FIG. 1 which is provided with an axial supply connector for the supply line 35, the metering valve 1 according to FIG. 2 is equipped with a lateral connector. The two valves have a long metering valve neck, the nozzle neck 67, to ensure at a corresponding temperature gradient that, in the rear portion of the valve, materials which are not so heat resistant are used for the spring 15 and the coil 7 as well as the supply line 35. The metering valve 1 also has a hydraulic part 3 and a magnetic part 5. The spring 15 is supported on the one hand against the magnet housing 11 and on the other hand relative to the armature 13, which is a flat armature. A coil 7 is located in the magnet housing 11. The tappet 17 which leads into the valve seat 21 via its rounded tip, has a shrink-fitted sleeve 51 on its other end. The valve seat 21 in the end piece 23 leads into the nozzle opening 25 which is covered by an optional nozzle plate 27 for distributing the liquid. The metering valve 1 comprises two compensation spaces 29 and 31 and has a further optional outlet 45. The first space 29 is delimited by a diaphragm 33. The space 29 adopts the function of an compensation space by means of the diaphragm 33. On the side opposing the compensation space 29, a hollow space 55 is provided. The diaphragm 33 is connected by spot welds or by thick welds to the valve housing 69 and the tappet 17. The diaphragm is made of metal. The liquid is transferred to the metering valve from a resilient hose via the supply line 35 in the sleeve 37 which has the sleeve side 39. In a less advantageous embodiment, a metal pipe can be provided instead of a resilient hose. As a result, however, a further compensation space is lost. The liquid, which is present in the supply line 35, flows via the annular space 19 along the tappet 17 to the valve seat 21. When current is applied to the coil 7, the armature 13 is pulled onto the coil 7. In the open state of the metering valve 1, the hollow space 55 is reduced or disappears. The spring 15 is pressed together by the armature 13. At the end of the operation of the motor vehicle, the coil 7 is switched to the currentless state. The tappet 17 is lowered onto its valve seat 21. The liquid which is present in the compensation space 31 is dispensed via the nozzle plate 27 into the exhaust gas stream of the vehicle. If the liquid in the annular space 19 is frozen by corresponding cooling of the metering valve 1, the freezing liquid presses against the diaphragm 33. The force of the freezing pressure is transferred via the disc 71 to the armature 13. The armature 13 presses against the spring 15. The tappet 17 is lifted from the valve seat 21 via the sleeve 51. The compensation space 31 is therefore opened up. The further compensation space 29 which may be enlarged by the diaphragm 33, offers additional space for the expansion of the frozen liquid. Moreover, the opening 45 which, however, does not have to be present, provides a compensation space. The hydraulic part 3 is narrower than the magnetic portion 5. As the hydraulic portion 3 has to be produced from heat resistant material, it would be preferable to use as little as possible of the valuable material. The bearing 57 delimits the possible amount of liquid which can be present in the annular space 19. The bearing guides the needle and/or the tappet which is optionally provided with holes.

Figure 3:
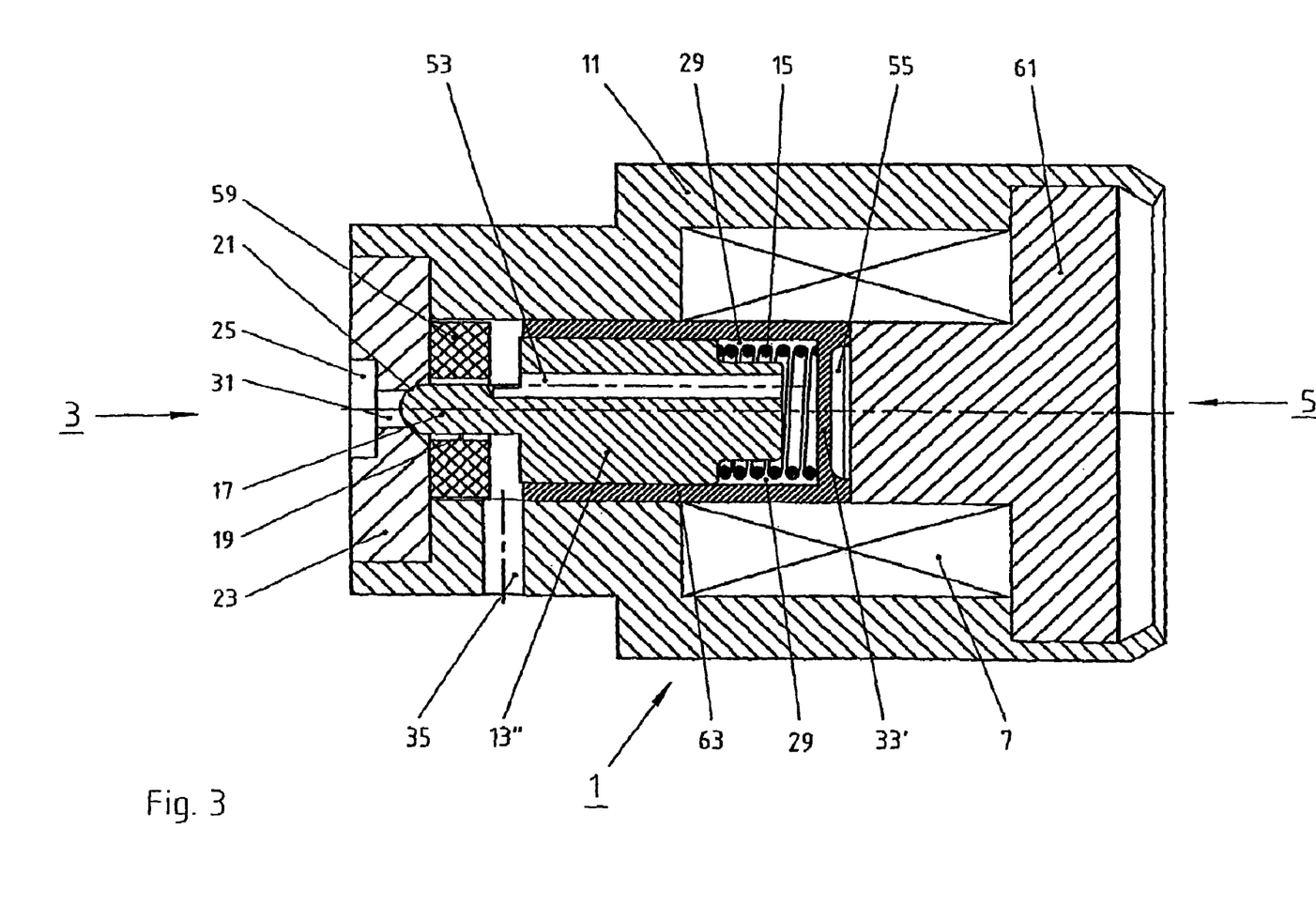
FIG. 3 discloses a third example embodiment of the present invention.

In FIG. 3 a further embodiment of a metering valve 1 according to the invention is disclosed. The entire metering valve 1 consisting of a hydraulic part 3 and a magnetic part 5 is, for example, shorter than the metering valves according to FIGS. 2 and 1. It is, however, wider. The geometry of the valve part is adapted to requirements. The metering valve is also rotationally symmetrically constructed, with a few exceptions. The armature 13" is a tappet armature which leads into a tappet 17 and has an armature bore 53. The spring 15, which is supported relative to the seal pot 63, engages on one side of the tappet armature 13". The seal pot 63 is equipped with a hollow space 55 which is intended to provide an expansion space for the volume from the space 29. The supply line 35 runs laterally to the tappet 17 which is partially surrounded by the inner space 19. The tappet 17 leads into the valve seat 21 of the end piece 23. The end piece 23, in this embodiment, is not equipped with a nozzle plate. Also, the compensation space 31 in the region of the nozzle opening 25 is smaller than in the metering valves according to FIG. 1 or 2. The bearing 57 delimits the maximum amount of liquid which can be located in the annular space 19 and in the supply line 35. If current is applied to the coil 7, the armature 13 is moved by the magnetic field against the spring force of the spring 15 in the direction of the pole core 61. As a result, the tappet 17 is lifted from the valve seat 21. In the currentless state, the tappet 17 sinks onto the valve seat 21. If the fluid freezes in the supply line 35 or the annular space 19, the freezing liquid presses against the tappet armature 13", the tappet armature 13" is moved against the spring 15. As a result, the UWS in the space 29 is forced in the direction of the resilient base 33. The spring 15 is pressed together. The tappet 17 is lifted from the valve seat 21. The liquid can be diverted into the compensation space 31. When the compensation space is not sufficient, an additional compensation space can be created by the resilient base 33 in the region of the spring 15. The magnet housing 11 is simultaneously the valve housing. The hollow space which is also a first compensation space 29, is in fluidic connection with the supply line 35 and the annular space 19 via the armature bore 53. The armature 13" is supported or surrounded on both sides by the liquid.

Figure 4:
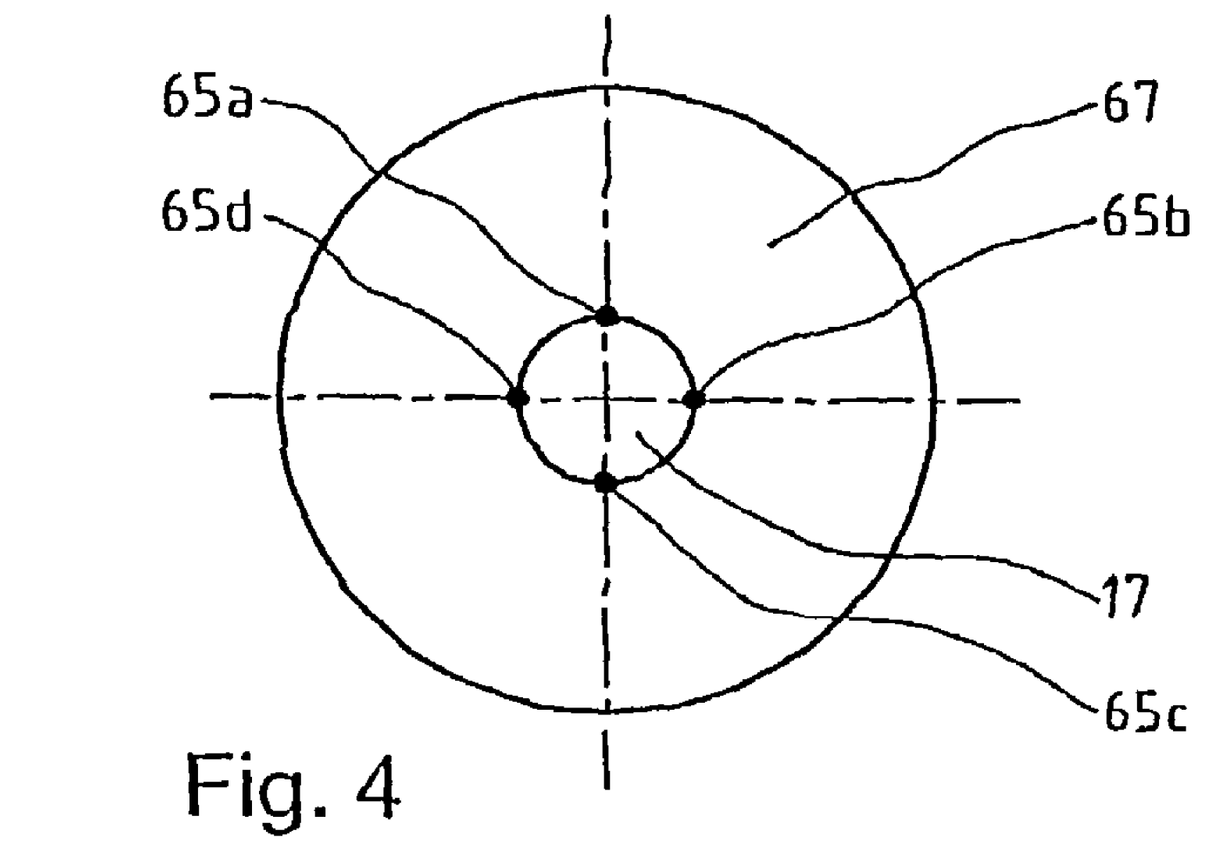
FIG. 4 illustrates a section through a nozzle neck of an example embodiment of the present invention according to FIG. 1 or 2.

In FIG. 4 a further alternative possibility is shown of how the amount of liquid present can be further reduced.

Instead of having a completely circumferential annular space 19 along the entire tappet 17, the tappet 17 is only partially provided with grooves and projections 65a, 65b, 65c and 65d. The remaining volume of the nozzle neck 67 is made from solid material. Only the minimal liquid present in the eccentric openings 65a, 65b, 65c and 65d can then still freeze. The solid material of the nozzle neck 67 further contributes to the strength of the nozzle neck 67. A nozzle neck shown can be present in the valves according to FIG. 1, FIG. 2 and also FIG. 3. The nozzle neck only has to be correspondingly adapted in each case.

The valves according to the invention are preferably connected to a resilient hose through which the liquid is conveyed to the metering valve. The valve seat opens into the exhaust gas stream of the motor vehicle. With vehicles driven by diesel engines, a 32.5% urea-water solution is conveyed through the valve. The freeze-resistant valves are, however, developed advantageously such that other liquids can also be conveyed through the metering valves. Thus pure water or salt water or even diesel can be conveyed just as efficiently through the valves.

The valve is characterized in that, on the one hand, it can operate in an environment which may reach more than 700° C. and, on the other hand, even at temperatures as low as −40° C. it undergoes no permanent damage. To this end, it contributes to minimizing the amount of liquid inside the valve. Moreover, only selected components are wetted by the liquid. The entire system operates passively in the frozen state. The system itself is relieved during freezing. No additional sources of energy are required. The liquid wettable spaces and liquid containing spaces are designed without undercuts or interfering contours. Even when valves have only one or other of the previously summarized features, they fall within the protective scope of this invention.

LIST OF REFERENCE NUMERALS

TABLE 1

| | |
|---|---|
| 1 | Metering valve |
| 3 | Hydraulic part |
| 5 | magnetic part |
| 7 | coil (with windings) |
| 9 | coil support |
| 11 | magnet housing |
| 13 | armature as flat armature |
| 13' | armature as sleeve armature |
| 13" | armature as tappet armature |
| 15 | spring (helical compression spring) |
| 17 | tappet |
| 19 | annular space |
| 21 | valve seat |
| 23 | end piece |
| 25 | nozzle opening |
| 27 | nozzle plate (optional) |
| 29 | first compensation space (as part of the freeze expansion space) |
| 31 | second compensation space (as part of the freeze expansion space) |
| 33 | diaphragm |
| 33' | resilient base |
| 35 | supply line |
| 37 | sleeve (ribbed exterior) |
| 39 | sleeve exterior |
| 41 | spot welds |
| 43 | projections |
| 45 | opening (second) |
| 47 | ring |
| 49 | O-ring seal |
| 51 | armature sleeve |
| 53 | armature bore |
| 55 | hollow space |
| 57 | bearing |
| 59 | sleeve |
| 61 | pole core |
| 63 | seal pot |
| 65 | annular space openings (65a, 65b, 65c, 65d) |
| 67 | nozzle neck |
| 69 | valve housing |
| 71 | disc |
| 73 | nozzle |

What is claimed is:

1. A freeze-resistant metering valve, comprising:
a magnetic part and a hydraulic part;
the magnetic part having an armature biased by a spring;
the hydraulic part having an annular space for receiving and conveying a urea-water solution and a tappet facing a valve seat, the annular space extending along at least a portion of the tappet; and
the valve seat having a nozzle opening,
wherein:
the metering valve is itself passively relieved during freezing of the urea-water solution;
a length of the annular space is created such that the magnetic part is positioned in a markedly lower temperature range than an end piece of the hydraulic part of the valve;
the urea-water solution is introduced into an exhaust gas stream without use of compressed air; and
an outlet is provided as a further opening in a vicinity of the nozzle opening, the further opening enabling a constant circulation of the urea-water solution such that the hydraulic part is cooled by the urea-water solution.

2. A freeze-resistant metering valve as claimed in claim 1, wherein a diameter of the annular space is reduced to a minimum volume, without a noticeable pressure loss occurring along the annular space.

3. A freeze-resistant metering as claimed in claim 1, wherein a diameter of the tappet is smaller than, or equal to, 2 mm and the annular space is 5 mm larger than the tappet.

4. A freeze-resistant metering valve as claimed in claim 1, wherein the metering valve has one of a diaphragm or a resilient base in its interior.

5. A freeze-resistant metering valve as claimed in claim 4, wherein the diaphragm or the resilient base is provided on a side of the tappet facing away from the valve seat.

6. A freeze-resistant metering valve as claimed in claim 4, wherein the diaphragm or the resilient base is in sealing contact with a valve housing.

7. A freeze-resistant metering valve as claimed in claim 4, wherein a freezing pressure of the urea-water solution deforms the diaphragm or the resilient base, by way of a relieving motion of solidifying urea-water solution during the freezing, and the deformed diaphragm or the deformed resilient base acts indirectly on the armature which lifts the tappet from the valve seat.

8. A freeze-resistant metering valve as claimed in claim 1, wherein the spring is located in the urea-water solution during operation.

9. A freeze-resistant metering valve as claimed in claim 8, wherein the spring is fixedly held by at least two projections as stop faces, and as a result no undercuts are formed which can hinder the flow of the urea-water solution.

10. A freeze-resistant metering valve as claimed in claim 1, wherein a compensation connection is provided in the armature.

11. A freeze-resistant metering valve as claimed in claim 1, wherein a pressure on two opposing sides of the armature is compensated for by a compensation bore in the armature.

12. A freeze-resistant metering valve as claimed in claim 1, wherein the hydraulic part of the metering valve has a smaller diameter than the magnetic part of the metering valve.

13. A freeze-resistant metering valve as claimed in claim 1, wherein one of a disc or a bearing is arranged in a vicinity of the valve seat.

14. A freeze-resistant metering valve as claimed in claim 13, wherein the disc or the bearing is provided with at least one through-passage.

15. A freeze-resistant metering valve as claimed in claim 1, wherein the valve is equipped with an axial connector for the urea-water solution.

16. A freeze-resistant metering valve as claimed in claim 1, wherein the armature has at least one of a round form and a form of a flat disc.

17. A freeze-resistant metering valve as claimed in claim 1, wherein a non-magnetic sealing ring is provided to deflect magnetic flux in a region of the armature.

18. A freeze-resistant metering valve as claimed in claim 1, wherein the valve seat is covered by a nozzle plate.

19. A freeze-resistant metering valve as claimed in claim 1, wherein the nozzle opening is in fluidic communication with a motor vehicle exhaust gas system.

20. A freeze-resistant metering valve as claimed in claim 1, wherein in a currentless state, the tappet blocks the annular space in the direction of said nozzle opening until a freeze expansion space is created by means of a freezing pressure from solidification of the urea-water solution during freezing, which freezing pressure acts indirectly on the armature which lifts the tappet from the valve seat.

* * * * *

UNITED STATES PATENT AND TRADEMARK OFFICE
CERTIFICATE OF CORRECTION

| | | |
|---|---|---|
| PATENT NO. | : 8,074,673 B2 | Page 1 of 1 |
| APPLICATION NO. | : 12/456395 | |
| DATED | : December 13, 2011 | |
| INVENTOR(S) | : Maisch et al. | |

It is certified that error appears in the above-identified patent and that said Letters Patent is hereby corrected as shown below:

Column 8, line 14: "2 mm and the annular space is 5 mm larger than the tappet." should read --2 mm and the annular space is 0.5 mm larger than the tappet.--

Signed and Sealed this

Thirty-first Day of January, 2012

David J. Kappos
*Director of the United States Patent and Trademark Office*